United States Patent [19]
Edmiston
[11] Patent Number: 4,690,791
[45] Date of Patent: Sep. 1, 1987

[54] PROCESS FOR FORMING CERAMIC PARTS

[75] Inventor: Charles G. Edmiston, San Ramon, Calif.

[73] Assignee: GTE Products Corporation, Stamford, Conn.

[21] Appl. No.: 782,822

[22] Filed: Oct. 2, 1985

[51] Int. Cl.[4] .............. B29C 59/00
[52] U.S. Cl. .............. 264/122; 264/69; 264/71; 264/DIG. 25; 264/DIG. 67; 264/573; 419/66
[58] Field of Search .............. 264/69, 71, DIG. 25, 264/DIG. 67, 122, 573; 419/66

[56] References Cited

U.S. PATENT DOCUMENTS 4,522,772 6/1985 Bevan .............. 264/71

FOREIGN PATENT DOCUMENTS 954184 8/1982 U.S.S.R. .............. 419/66

*Primary Examiner*—Stephen J. Lechert, Jr.
*Attorney, Agent, or Firm*—Donald R. Castle

[57] ABSTRACT

In a process wherein parts are pressed into a predetermined shape by filling a die cavity with a powder material, compressing the powder under pressure to form a compressed part of said shape, an improvement to that process comprises subjecting a portion of the cavity to vibrations during the filling of the die cavity.

5 Claims, 5 Drawing Figures

THREE DISTINCTIVE LAYERS AS COMPACTION BEGINS

1. THE TOP LAYER IS DEFORMED DUE TO FP AND Fs
2. THE SECOND LAYER IS BEING DENSIFIED BY SMALLER PARTICLES FILLING THE VOIDS
3. THE BOTTOM LAYER IS LOOSELY PACKED POWDER

PROCESS FOR FORMING CERAMIC PARTS

BACKGROUND OF THE INVENTION

In the dry pressing of parts from powdered materials, in particular cylindrical parts with large length to wall thickness ratios, the practical net shape limit under the present technology is approximately 4 to 1. For example, a cylindrical shape with a wall thickness of about 0.100 inches has a practical maximum length of about 0.400 inches. Once this ratio is exceeded, a variation of green density along the length of the cylinder results in distortion and porosity at the center along the length of the cylinder during the sintering process.

Since parts with higher length to wall thickness ratios higher than 4:1 are required in a variety of applications, a process by which such cylindrical ceramic parts can be produced without distortion and porosity would be an advancement in the art.

SUMMARY OF THE INVENTION

In accordance with one aspect of this invention wherein parts are pressed into a pre-determined shape by filling a die cavity with a powder having widely various relative sizes of generally spherical shape, compressing the powder under pressure to form a compressed part of the predetermined shape, an improvement constitutes providing a vibratory motion of a frequency of from about 2 to about 200 KHz to at least a portion of the die cavity to thereby cause an induced motion to the powder during the filling of the die cavity.

DETAILED DESCRIPTION OF THE INVENTION

Figure 1:
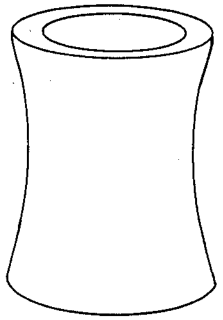
FIG. 1 is an illustration of the "hour glass" variation caused by green density variation.
Figure 2:
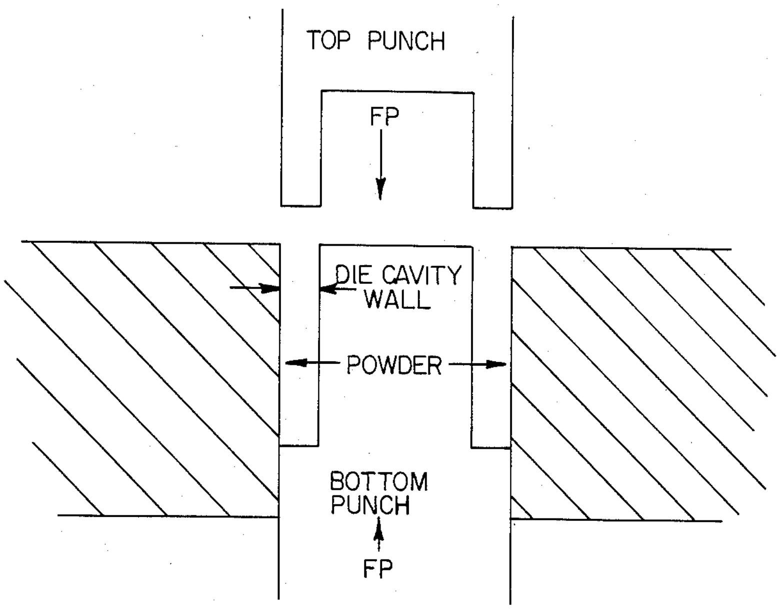
FIG. 2 is a drawing illustrating a typical die punch.
Figure 3:
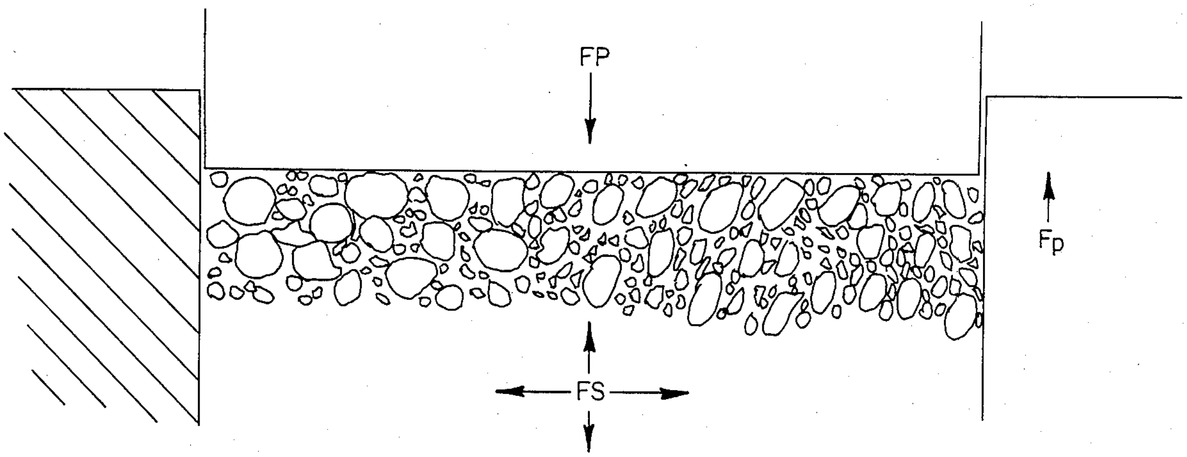
FIG. 3 is a drawing illustrating the typical powder fill below the top punch.

For a better understanding of the present invention, together with other and further objects, advantages, and capabilities thereof, reference is made to the following disclosure and appended claims in connection with the foregoing description of some of the aspects of the present invention.

This invention relates to a process for forming ceramic parts. More particularly, it relates to a process for forming pressed parts from powdered material using sound waves to compact the powder prior to pressing in a dry pressing operation.

In accordance with one aspect of this invention wherein parts are pressed into a pre-determined shape by filling a die cavity with a powder having widely various relative sizes of generally spherical shape, compressing the powder under pressure to form a compressed part of a predetermined shape, there is provided an improvement of providing a acoustical energy of a frequency of from about 2 to about 200 KHz to at least a portion of the die cavity to thereby cause an induced motion to the powder during the filling of the die cavity.

The powder, for example, a ceramic aluminum oxide powder is subjected to vibration during the filling of the die cavity. It is then compressed under pressure to form a compressed ceramic part by standard methods.

In dry pressing cylindrical shaped ceramic parts with large length to wall thickness rations, a constraint is a phenomenon known as "bridging". In order to understand the concept of bridging, powder can be thought of as being a pool of balls of a wide size spectrum. The spheres consist of an agglomeration of particles which are held together with a high surface tension plastic binder material. The purpose of the spherical agglomerate, which is a product of a spray drying process, is to provide a particle configuration such that the loose material can flow uniformly into a cavity or mold.

Simply stated, the purpose of the pressing process is to amalgamate the loosely packed agglomerates by crushing the spheres. It is important to point out that the flow characteristics of the powder instantaneously reduce by several orders of magnitude when the spheres are crushed.

In pressing a shape, it is desirable for all of the flow to take place prior to pressing and then as the force of the press is applied to the powder, for all of the spheres to "crush" in place simultaneously. Unfortunately, this does not happen in actual practice.

During the early stages of the compaction cycle, the force of the top punch is first met with the particle static resistance to motion. At the interface between the punch and the loosely packed pool of spheres, the particle resistance is quite small. The smaller particles closest to the punch having suitable free space in which to move will respond to the force by scrambling to fill the voids around the larger spheres. As the voids around the larger spheres become full, they begin to transmit the force of the punch to successive layers of spheres. The successive layers, of course, have less free space, that is, vertical component, with which to move. The force between spherical shapes is therefore increased resulting in higher resistance to motion, that is, inner particle friction. The resultant resistance to motion at the lower layers is transmitted through the material, in accordance with Newton's Third Law, back to the punch.

As the static resistance to motion builds up, the particles closest to the punch are squeezed between the back force caused by resistance to particle motion and the force of the punch. The spherical shapes next to the punch become oval shaped transmitting the force in a planar direction against the walls of the cavity.

As the spheres flatten out and transmit force to the cavity walls, the friction between the compressed material and the die wall cavity becomes a significant impedance to the force of the punch causing additional spheres closest to the punch to collapse. This, of course, results in additional friction between the material and the die wall cavity. Additional forces must be supplied through the punch to overcome the die wall friction and compress successive layers of powder. The extra force required to overcome the die wall cavity friction increases as the square of the amount of powder which is compressed. The effect is a powder bridge between the outer cavity wall and the core pin which prevents pressure from being distributed uniformly along the entire length of the cylinder.

If the bridge can be broken, the total axial force of the press can be distributed uniformly along the cylinder length resulting in uniform densification of the powder. The prior art method is to add die lubricants to the powder to reduce the coefficient of friction between the compressed powder and the die wall. Unfortunately, the frictional force increases as the square of the amount of powder that is compressed, therefore a reduction of the coefficient of friction by about 50% yields only about a 25% reduction in friction.

As indicated previously, spray dried powders consist of a large number of microscopic spherical shapes, ranging widely in relative size. For example, the bulk density of a sample of spray dryed aluminum oxide powder is measured in accordance with standard measuring techniques. Then without removing the powder from the container, ultrasonic energy is applied to the outside of the container. Additional powder is added as the powder begins to compact under the influence of the ultrasonic energy. The result is that the bulk density changes from about 1.04 to about 1.2 g/cc or approximately 15%. Since the force applied to the loosely packed powder is quite small, the only explanation for the increase in bulk density is a migration of the smaller shperical particles around the larger particles filling voids which are intrinsic to loosely packed powder.

In essence, the application of induced vibratory energy to the powder eliminates the component related to static resistance from the pressing compaction cycle. Since the powder has been compacted to where there is a near absence of voids, that is, except within the spheres, the compliance of the powder system is reduced to the compliance of the spherical material. Therefore, axial pressure applied to the powder is distributed linearly along the length of the powder system deforming the spherical shapes uniformly along the length.

At the point where the spheres begin to deform, they push uniformly against the die cavity wall creating a uniform force along the length between the powder and the cavity.

Since the punch is moving in an axial direction, the material closest to the punch is in motion while the material closest to the center along the length of the cavity is not. The kinetic friction of the compressed powder on the cavity wall closest to the punch is less than the static friction at the center of the cavity along the length, (about 30% to about 50% less). The result is that the back force caused by the static friction squeezes the particles nearer to the punch more than the powder at the center along the length. As previously described, this force differential causes the particles closer to the punch to deform before those closer to the center and ultimately forms a powder bridge.

In the examples described above, a bridge can be formed primarily because of the substantial difference between the static and kinetic coefficients of friction at the die wall powder interface. It is believed that the addition of acoustic energy along one of the die cavity walls has two distinctive and beneficial effects. The first is to change the coefficient of friction to kinetic friction uniformly along the cavity wall. The second benefit results from the reduction in friction caused by high intensity compression and rarefaction waves at the interface between the powder and the die wall cavity. In both cases the net effect is to break or reduce the powder bridge such that the full axial force of the press is substantially distributed along the length of the pressed powder.

Figure 4:
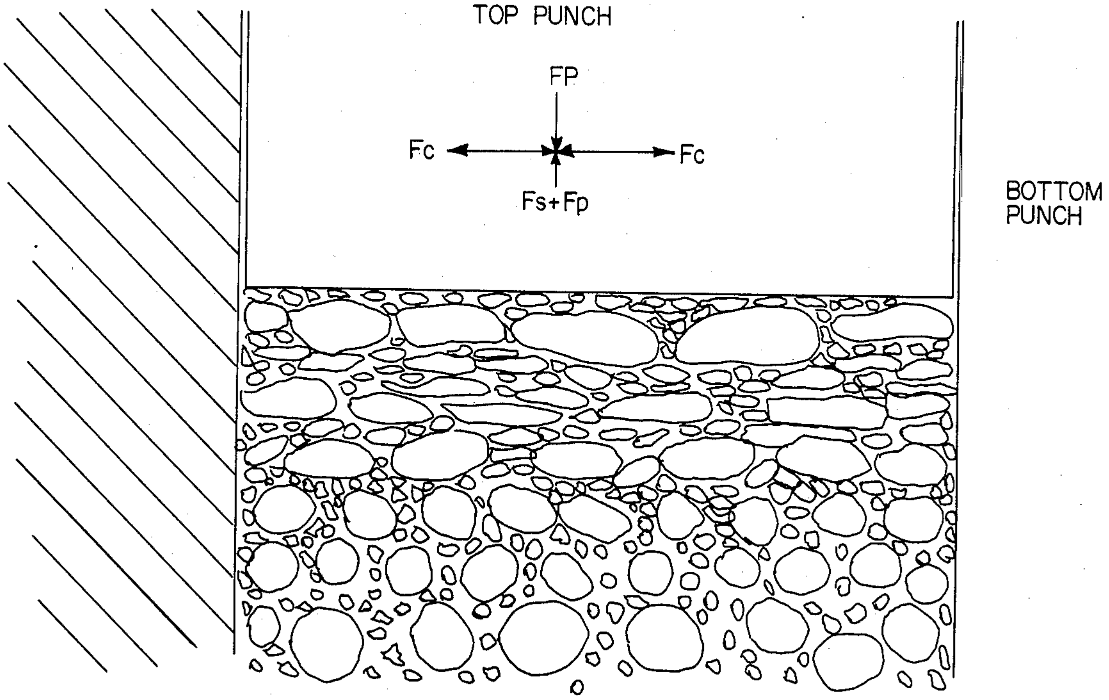
FIG. 4 is a drawing illustrating the typical powder fill in the die.
Figure 5:
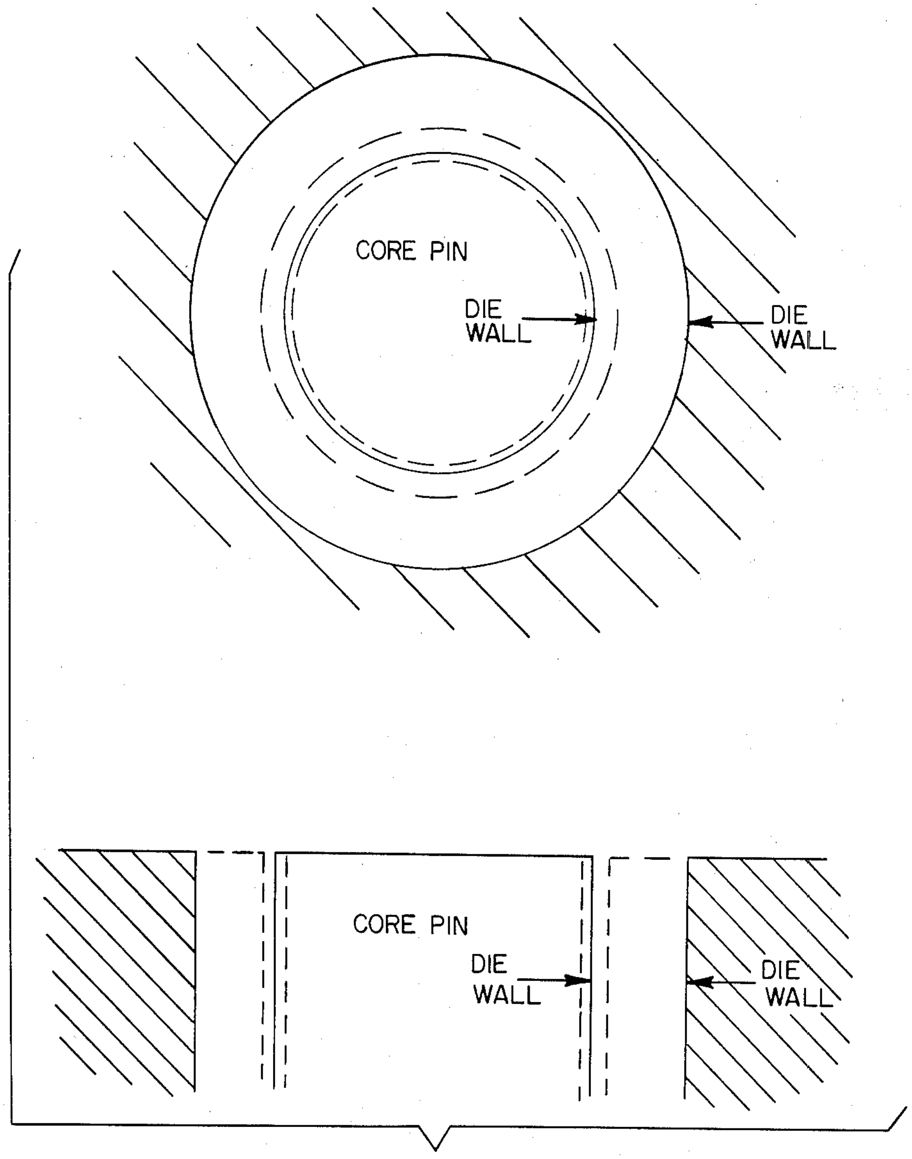
FIG. 5 illustrates the die having the accoustical vibrator.

The following is a brief explanation of the mechanics involved in this application and can best be explained in reference to the FIG. 4, FIG. 4 is a cross sectional view of a dry pressing die 10 designed to axially press cylindrical shape. The core pin 12 is positioned inside the inner die wall 14. The core pin 12 oscillates laterally toward an away from outer die wall 16.

As the core pin expands in the planar direction, the force accelerates the material in the planar direction toward the outer diameter die wall. As it contracts it leaves air voids between the material and the core pin. The core pin expands and contracts at a frequency of from about 20 to about 30 Khz, that is, the frequency is dependent on hoop resonance of the core pin.

It is important to point out that which is not obvious to the naked eye. While the core pin does not really seem to be in motion, the fact is, that if the core pin is expanding and contracting about 0.0005 inches at a rate of about 20 Khz, it is actually moving at an average speed of about 20 inches per second with peak angular velocities of about 1,600,000 inches per second and at a force equal to the modulus of the core pin material. Since the entire core pin is in motion, the pressure differential caused by the difference in coefficient of static and kinetic friction is non-existant.

As the force of the punch is applied to the powder in the axial direction, the powder begins to compress in the axial direction and, because of the deformation of the spherical particles, begins to expand in the planar direction toward the core pin and the outer die cabity wall. Since the core pin is expanding and contracting, the tendency is to accelerate the powder away from the core pin toward the outer cavity wall during the expansion cycle and then leave a void between the core pin and the powder during the contraction cycle. The interface between the powder and the core pin therefore is a layer of air which is undergoing rerefaction and compression. This layer of air now becomes the bearing surface for the powder as it travels with the force of the punch down the core pin in the axial direction.

With the core pin having very little friction compared to the total friction in the system, powder bridges do not generally form between the wall cavity and the core pin. The result is that the axial force of the punch is delivered along the total length of the material causing it to densify uniformly along the length.

While the previous discussion has centered around the use of vibrations in the manufacture of cylindrical shapes, it is believed that this technology has a much wider degree of application.

For example ceramic shapes which have large aspect ratios, that is, shapes which have a thickness to length ratio of greater than 4:1 can be produced. Additionally, the process is beneficial in producing shapes having a width to length ratio greater than 1:10. Presently the primary limiting factor in dry pressing large aspect ratio parts for example, about 4 inches long × about 4 inches wide × about 0.020 inches thick, is the uniform filling of the cavity. Variations of green density due to non-uniform cavity fill cause the part to go out of tolerance and ultimately results in serious distortion during the sintering process. As indicated previously, under particle migration, the ultimate bulk density can be achieved by applying acoustic energy to the powder in the die cavity during the fill motion. The result is a uniform pressed green density which will shrink uniformly during the sintering process.

The vibratory motion can vary from the sonic range of about 2 Kilo Hertz to about 50 Kilo Hertz although the ultrasonic range is preferred that is from greater than about 20 Kilo Hertz to about 200 Kilo Hertz. This vibratory motion can be transmitted to any portion of the cavity such as by a moving core pin as previously described or by a rod or similar part in contact with the inner or outer die cavity wall which rod or part is also connected to an electromechanical tranducers to give the vibratory motion within the ranges previously specified. The preferred range is from about 10 Kilo Hertz to about 50 Kilo Hertz.

Tolerance is a major factor in dry pressing yields. It is believed that non uniform cavity fill is the major cause of tolerance variation in a dry pressed part. About a 4% variation in bulk density yields about a 2% variation in linear dimension at the fired stage (assumed ideal cubical shape). When the powder changes as much as about 15% in bulk density with the addition of machine vibration and gravity, tolerances are very difficult to control. It is believed that vibratory energy applied during the fill motion can reduce the variation in bulk density within much material to less than about 0.5% and linear dimensions to less than about 0.2%.

While there has been shown and described what are at present considered the preferred embodiments of the invention, it will be obvious to those skilled in the art that various changes and modifications may be made therein without departing from the scope of the invention as defined by the appended claims.

What is claimed:

1. A process comprising:

(a) filling a die cavity of sufficient dimensions to produce parts having an aspect ratio of greater than 4:1 with a powder having widely varying realtive sizes of generally spherical shapes.

(b) providing an acoustical energy of a frequency of from about 2 to about 200 kilohertz to at least a portion of said cavity to thereby cause an induced motion to said powder during the filling of said die cavity and (c) compressing said powder under pressure to form a compressed part having said aspect ratio.

2. A process according to claim 1, wherein said powder morphology is substantially spherical.

3. A process according to claim 1 wherein said frequency is from about 10 KHz to about 50 KHz.

4. A process according to claim 1 wherein said predetermined shape has a width to length ratio of greater than 1:10.

5. A process according to claim 4 wherein said shape is a hollow cylinder.

* * * * *